(12) United States Patent
Boynton et al.

(10) Patent No.: US 7,827,597 B2
(45) Date of Patent: Nov. 2, 2010

(54) SECURE TRANSPORT FOR MOBILE COMMUNICATION NETWORK

(75) Inventors: Lee R. Boynton, Lake Oswego, OR (US); Trevor A. Fiatal, Freemont, CA (US); Scott M. Burke, Mountain View, CA (US); Mark Sikes, Ben Lomond, CA (US)

(73) Assignee: Seven Networks, Inc., Redwood City, CA (US)

( * ) Notice: Subject to any disclaimer, the term of this patent is extended or adjusted under 35 U.S.C. 154(b) by 413 days.

(21) Appl. No.: 11/875,785

(22) Filed: Oct. 19, 2007

(65) Prior Publication Data
US 2008/0037787 A1    Feb. 14, 2008

Related U.S. Application Data

(63) Continuation of application No. 10/339,369, filed on Jan. 8, 2003, now Pat. No. 7,305,700.

(60) Provisional application No. 60/346,881, filed on Jan. 8, 2002, provisional application No. 60/403,249, filed on Aug. 12, 2002.

(51) Int. Cl.
*H04L 29/00* (2006.01)
(52) U.S. Cl. .......................... 726/4; 380/270
(58) Field of Classification Search .................. 726/11
See application file for complete search history.

(56) References Cited

U.S. PATENT DOCUMENTS

| 4,255,796 A | 3/1981 | Gabbe et al. |
| 4,276,597 A | 6/1981 | Dissly et al. |
| 4,531,020 A | 7/1985 | Wechselberger et al. |
| 4,831,582 A | 5/1989 | Miller et al. |
| 4,875,159 A | 10/1989 | Cary et al. |
| 4,897,781 A | 1/1990 | Chang et al. |
| 5,263,157 A | 11/1993 | Janis |
| 5,357,431 A | 10/1994 | Nakada et al. |
| 5,386,564 A | 1/1995 | Shearer et al. |
| 5,392,390 A | 2/1995 | Crozier |
| 5,572,571 A | 11/1996 | Shirai |
| 5,572,643 A | 11/1996 | Judson |

(Continued)

FOREIGN PATENT DOCUMENTS

JP    4-154233    5/1992

(Continued)

OTHER PUBLICATIONS

Grous, Paul J., "Creating an Managing a Website with Lotus' InterNotes Web Publisher", The View Technical Journal for Lotus Notes® Software, vol. 1, Issue 4, Sep./Oct. 1995, pp. 3-18.

(Continued)

*Primary Examiner*—Matthew B Smithers
(74) *Attorney, Agent, or Firm*—Townsend and Townsend and Crew LLP

(57) ABSTRACT

A communication network encrypts a first portion of a transaction associated with point-to-point communications using a point-to-point encryption key. A second portion of the transaction associated with end-to-end communications is encrypted using an end-to-end encryption key.

19 Claims, 7 Drawing Sheets

U.S. PATENT DOCUMENTS

| | | |
|---|---|---|
| 5,581,749 A | 12/1996 | Hossain et al. |
| 5,600,834 A | 2/1997 | Howard |
| 5,613,012 A | 3/1997 | Hoffman et al. |
| 5,623,601 A | 4/1997 | Vu |
| 5,627,658 A | 5/1997 | Connors et al. |
| 5,630,081 A | 5/1997 | Rybicki et al. |
| 5,634,053 A | 5/1997 | Noble et al. |
| 5,647,002 A | 7/1997 | Brunson |
| 5,652,884 A | 7/1997 | Palevich |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,701,423 A | 12/1997 | Crozier |
| 5,704,029 A | 12/1997 | Wright, Jr. |
| 5,706,502 A | 1/1998 | Foley et al. |
| 5,710,918 A | 1/1998 | Lagarde et al. |
| 5,713,019 A | 1/1998 | Keaton |
| 5,715,403 A | 2/1998 | Stefik |
| 5,717,925 A | 2/1998 | Harper |
| 5,721,908 A | 2/1998 | Lagarde et al. |
| 5,721,914 A | 2/1998 | DeVries |
| 5,727,202 A | 3/1998 | Kucala |
| 5,729,735 A | 3/1998 | Meyering |
| 5,745,360 A | 4/1998 | Leone et al. |
| 5,752,246 A | 5/1998 | Rogers et al. |
| 5,757,916 A | 5/1998 | MacDoran et al. |
| 5,758,150 A | 5/1998 | Bell et al. |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,787,441 A | 7/1998 | Beckhardt |
| 5,790,425 A | 8/1998 | Wagle |
| 5,790,790 A | 8/1998 | Smith et al. |
| 5,799,318 A | 8/1998 | Cardinal et al. |
| 5,818,437 A | 10/1998 | Grover et al. |
| 5,832,483 A | 11/1998 | Barker |
| 5,857,201 A | 1/1999 | Wright, Jr. et al. |
| 5,870,759 A | 2/1999 | Bauer et al. |
| 5,907,618 A | 5/1999 | Gennaro et al. |
| 5,909,689 A | 6/1999 | Van Ryzin |
| 5,943,676 A | 8/1999 | Boothby |
| 5,961,590 A | 10/1999 | Mendez et al. |
| 5,968,131 A | 10/1999 | Mendez et al. |
| 5,974,327 A | 10/1999 | Agrawal et al. |
| 6,006,274 A | 12/1999 | Hawkins et al. |
| 6,023,708 A | 2/2000 | Mendez et al. |
| 6,044,381 A | 3/2000 | Boothby et al. |
| 6,047,051 A | 4/2000 | Ginzboorg et al. |
| 6,085,192 A | 7/2000 | Mendez et al. |
| 6,119,014 A | 9/2000 | Alperovich et al. |
| 6,131,096 A | 10/2000 | Ng et al. |
| 6,131,116 A | 10/2000 | Riggins et al. |
| 6,138,013 A | 10/2000 | Blanchard et al. |
| 6,138,124 A | 10/2000 | Beckhardt |
| 6,141,664 A | 10/2000 | Boothby |
| 6,151,606 A | 11/2000 | Mendez |
| 6,173,446 B1 | 1/2001 | Khan et al. |
| 6,198,922 B1 | 3/2001 | Baynham |
| 6,201,469 B1 | 3/2001 | Balch et al. |
| 6,212,529 B1 | 4/2001 | Boothby et al. |
| 6,221,877 B1 | 4/2001 | Aronov et al. |
| 6,223,187 B1 | 4/2001 | Boothby et al. |
| 6,233,341 B1 | 5/2001 | Riggins |
| 6,246,875 B1 | 6/2001 | Seazholtz et al. |
| 6,317,594 B1 | 11/2001 | Gossman et al. |
| 6,320,943 B1 | 11/2001 | Borland |
| 6,324,542 B1 | 11/2001 | Wright, Jr. et al. |
| 6,415,031 B1 | 7/2002 | Colligan et al. |
| 6,421,781 B1 | 7/2002 | Fox et al. |
| 6,438,612 B1 | 8/2002 | Ylonen et al. |
| 6,490,353 B1 | 12/2002 | Tan |
| 6,499,054 B1 | 12/2002 | Hesselink et al. |
| 6,526,506 B1 | 2/2003 | Lewis |
| 6,668,046 B1 | 12/2003 | Albal |
| 6,707,801 B2 | 3/2004 | Hsu |
| 6,708,221 B1 | 3/2004 | Mendez et al. |
| 6,732,158 B1 | 5/2004 | Hesselink et al. |
| 6,745,024 B1 | 6/2004 | DeJaco et al. |
| 6,799,190 B1 | 9/2004 | Boothby |
| 6,892,070 B2 | 5/2005 | Warrier et al. |
| 6,931,529 B2 * | 8/2005 | Kunzinger ............ 713/153 |
| 6,947,770 B2 | 9/2005 | Rydbeck |
| 6,986,061 B1 * | 1/2006 | Kunzinger ............ 713/153 |
| 7,032,242 B1 | 4/2006 | Grabelsky et al. |
| 7,062,024 B2 | 6/2006 | Kreckel et al. |
| 7,120,692 B2 | 10/2006 | Hesselink et al. |
| 7,219,222 B1 | 5/2007 | Durbin et al. |
| 7,310,729 B2 | 12/2007 | Gordon et al. |
| 7,382,879 B1 | 6/2008 | Miller |
| 7,389,412 B2 * | 6/2008 | Sharma et al. ............ 713/153 |
| 2001/0032254 A1 | 10/2001 | Hawkins |
| 2001/0034244 A1 | 10/2001 | Calder et al. |
| 2001/0037453 A1 | 11/2001 | Mitty et al. |
| 2002/0038253 A1 | 3/2002 | Seaman et al. |
| 2002/0042875 A1 * | 4/2002 | Shukla ............ 713/151 |
| 2002/0059457 A1 | 5/2002 | Ballard et al. |
| 2002/0068559 A1 | 6/2002 | Sharma et al. |
| 2002/0077077 A1 | 6/2002 | Rezvani et al. |
| 2002/0078384 A1 | 6/2002 | Hippelainen |
| 2002/0091921 A1 | 7/2002 | Kunzinger |
| 2002/0144109 A1 | 10/2002 | Benantar et al. |
| 2002/0146129 A1 | 10/2002 | Kaplan |
| 2002/0161925 A1 | 10/2002 | Munger et al. |
| 2002/0186848 A1 | 12/2002 | Shaik |
| 2002/0194209 A1 | 12/2002 | Bolosky et al. |
| 2002/0198027 A1 | 12/2002 | Rydbeck |
| 2003/0093691 A1 | 5/2003 | Simon et al. |
| 2003/0100326 A1 | 5/2003 | Grube et al. |
| 2003/0126216 A1 | 7/2003 | Avila et al. |
| 2003/0130984 A1 | 7/2003 | Quinlan et al. |
| 2003/0157947 A1 | 8/2003 | Fiatal et al. |
| 2003/0177281 A1 | 9/2003 | McQuillan et al. |
| 2004/0170257 A1 | 9/2004 | Gross et al. |
| 2004/0179513 A1 | 9/2004 | Smith et al. |
| 2004/0255126 A1 | 12/2004 | Reith |
| 2005/0063544 A1 | 3/2005 | Uusitalo et al. |
| 2005/0120082 A1 | 6/2005 | Hesselink et al. |
| 2005/0138111 A1 | 6/2005 | Aton et al. |
| 2005/0183143 A1 | 8/2005 | Anderholm et al. |

FOREIGN PATENT DOCUMENTS

| | | |
|---|---|---|
| JP | 2001-218185 | 10/2001 |
| WO | WO 97/41661 | 11/1997 |
| WO | 9824257 | 6/1998 |
| WO | WO 98/58322 | 12/1998 |
| WO | 03098890 | 11/2003 |
| WO | 2004045171 | 5/2004 |

OTHER PUBLICATIONS

Blaney Jeff, "You Can Take it with you: An Introduction to Mobile Computing with Notes R4", The View Technical Journal for Lotus Notes® Software, vol. 2, Issue 1 Jan./Feb. 1996, pp. 22-32.

Lotus Development Corporation, Lotus Notes: The Groupware Standard-Windows, Version 3.3, 1994.

Lotus NotesPump miscsellaneous paper, date unknown.

NotesPump 1.0 Release Notes, date unknown.

Lotus Notes-Notes Administration Help screen shot, date unknown.

Chapter 13-1, publication unknown, "Anatomy of a Note ID", date unknown.

Chapter: About NotesPump, publication unknown, date unknown.

Lotus Development Corporation, Lotus Quick Reference for SmartIcons, Lotus Notes Relaease 3.1, Date unknown.
Lotus Development Corporation, Lotus Quick Reference for Windows and Presentation Manger, Lotus Notes Release 3, Date unknown.
Lotus Development Corporation, Lotus Quick Reference for Macintosh, Lotus Notes Release 3.0, Date Unknown.
Lotus Development Corporation, Lotus Quick Reference for Application Developer's Lotus Notes Release 3, Date Unknown.
Lotus Development Corporation, Lotus Customer Support Services, Lotus Notes Customer Support Guides, date unknown.
Lotus Software Agreement for Notes 4.0 NA DKTP Client UPO, Part No. 38985, Date unknown.
Lotus Development Corporation, Lotus Notes 3.3, Lotus Customer Support, North American Guide, 29 pages, Date uknown.
Lotus Development Corporation, Lotus Notes 4.0, Lotus Customer Support, North American Guide, 29 pages, Date uknown.
Lotus Development Corporation, Lotus Notes 4.1 Starter Pack, Lotus Customer Support, North American Guide, 51 pages, date unknown.
Lotus Development Corporation, "LotusScript Classes for Notes Release 4" 6 pages, date unknown.
Allchin, James E.. "An Architecture for Reliable Decentralized Systems", UMI Dissertation Services, Copyright 1983.
Lotus Development Corporation, Lotus Notes Release 3.1: The Groupware Standard, Administrator's Guide—Server for NetWare, OS/2 and UNIX, 1989.
Lotus Development Corporation, Lotus Notes Release 3.1: The Groupaware Standard, Site and Systems Planning Guide 1991.
Wilcox, Adam A., PC Learning Labs Teaches Lotus Notes 3.0: The Quick and Eaxy Way to Learn, Ziff-Davis Press, 1993.
Lotus Development Corporation, Lotus Notes Release 3.3: Start Here, Workstation Install for Windows, OS/2 and Macintosh, 1993.
Lotus Development Corporation, Lotus Notes Release 3.1: Administrator's Guide Server for Windows, 1993.
Lotus Development Corporation, Lotus Notes Release 3.1: The Groupware Standard, Custormer Services Application Guide, 1994.
Lotus Development Corporation, Lotus Notes Release 3.1: The Groupware Standard, Getting Started with Application Development, 1994.
Lotus Development Corporation, Lotus Notes Release 3.1: The Groupware Standard, Network Driver Documentation, 1994.
Kornblith, Polly R., Lotus Notes Answers: Certified Tech Support, Covers Lotus Notes Release 3, Osborne McGraw-Hill, 1994.
Freeland, Pat and Londergan, Stephen, Lotus Notes 3/3.1 for Dummies™ IDG Books Worldwide, 1994.
Gwirtz, David, Lotus Notes 3 Revealed! Your Guide to Managing Informationand Improving Communication Throughout Your Orgainzation, Prima Publishing 1994.
Shafran, Andrew B., Easy Lotus Notes for Windows™, Que® Corporation, 1994.
Lotus Development Corporation, Lotus Notes Release 3.3: The Groupware Standard, Administration, 1994.
McMullen, Melanie, Editor, Network Remote Access and Mobile Computing, Miller Freeman Inc., 1994.
Lotus Development Corporatiom, Lotus Notes: The Groupware Standard—Windows, 1994.
IntelliLink Corporation, IntelliLink® for Windows Iser's Guide, Version 3.0, 1994.
Lotus Development Corporation, Lotus Notes Release 4: InterNotes Web Navigator Administrator's Guide, 1995.
Lotus Development Corporation, Lotus InterNotes Release 4 Web Publisher: InterNotes Web Publisher Guide, 1995.
Lotus Development Corporation, Lotus Notes Release 4 Install Guide for Servers, 1995.
Lotus Development Corporation, Lotus Notes Release 4.1 Release Notes, 1995.
Lotus Development Corporation, Lotus Notes Release 4 Migration Guide, 1995.
Lotus Development Corporation, Lotus Notes Release 4 Database Manager's Guide 1995.
Lotus Development Corporation, Lotus Notes Release 4 Install Guide for Workstations, 1995.
Lotus Development Corporation, Lotus Step by Step: A Beginner's Guide to Lotus Notes, 1995.
Lotus Development Corporation, Lotus Notes Release 4 Programmer's Guide Part 1, 1995.
Lotus Development Corporation, Lotus Notes Release 4 Programmer's Guide Part 2, 1995.
Lotus Development Corporation, Lotus Notes Release 4 Administrator's Guide, 1995.
Lotus Development Corporation, Lotus Notes Release 4 Deployment Guide, 1995.
Lotus Development Corporation, Lotus Notes Release 4 Application Developer's Guide, 1995.
Lotus Development Corporation, Lotus Notes Release 4 InterNotes Web Navigator User's Guide, 1995.
Lotus Development Corporation, Lotus Notes Release 4 Release Notes, 1995.
Lotus Development Corporation, Lotus Notes Release 4.5 Install Guide for Workstations, 1995.
Lotus Development Corporation, Release Notes, Lotus Notes Release 3.30, Windows, OS/2, and Macintosh, 1995.
Brown, Kevin, et al., Mastering Lotus ® Notes®, SYBEX Inc., 1995.
Lotus Development Corporation, Lotus Notes Release 4.5, Network Configuration Guide, 1995.
Netscape Communications Corporation, installation Guide Netscape Mail Server, Version 2.0 for Unix, 1995.
Netscape Communications Corporation, User's Guide, Netscape Mail Server, Version 2.0, 1995.
Netscape Communications Corporation, Adminstrator's Guide, Netscape Mail Server, Version 2.0, 1995.
Pyle, Hugh, "The Architectgure of Lotus Notes", Lotus Notes Advisor, Advisor Publications, Premiere Issue 1995, pp. 18-27.
Lotus Notes Advisor, Advisor Publications, Jun. 1995, entire magazine.
IBM, The Architecture of Lotus Notes, White Paper, No. 114654, modified date: May 31, 1995.
Lotus Development corporation, Lotus Notes Knowledge Base, "What is the Notes Replicator", Jul. 5, 1995.
Lotus Notes Advisor, Advisor Publications, Aug. 1995, entire magazine.
Lotus Notes Advisor, Advisor Publications, Oct. 1995, entire magazine.
Cole, Barb, "Lotus airs Notes-to-database integration tool", www.looksmart.com, Oct. 2, 1995.
Lotus Development Corporation, Lotus Notes Knowledge Base, "Lotus Announces Lotus NotesPump 1.0", Oct. 31, 1995.
Lotus Development Corporation, Lotus Notes Knowledge Base, Lotus NotesPump 1.0 Q & A, Oct. 31, 1995.
Lotus Development Corporation, Lotus Notes Knowledge Base, "Lotus NotesPump: Database Integration for Lotus Notes", Oct. 31, 1995.
Lotus Development Corporation, Lotus Notes Knowledge Base, "How to Set Up "Firewall" Protection for a Notes Domain", Nov. 6, 1995.
Balabam. Bob, "This is Not Your Father's Basic: LotusScript in Notes Release 4", Lotus Notes Advisor, Advisor Publications, vol. 1, No. 5, Nov./Dec. 1995, pp. 31-58.
Pyle, Lisa, "A JumpStart to the Top Ten R3-to-R4 Migration Consideration", Lotus Advisor, Advisor Publications, vol. 1, No. 5, Nov./Dec. 1995, pp. 3-20.
Lotus Notes Advisor, Advisor Publications, DecemLotus Notes Advisor, Advisor Publications, Dec. 1995, entire magazine. ber 1995, entire magazine.
Lotus Development Corporation, Lotus Notes Release 4, Install Guide for Workstations, First Revision, 1996.
Lotus Development Corporation, Lotus Step by Step: A Beginner's Guide to Lotus Notes, First Revision, 1996.
Freeland, Pat and Londergan, Stephen, Lotus Notes Release 4 for Dummies™, IDG Books Worldwide, 1996.
Kreisle, Bill, Teach yourself . . . Lotus Notes 4, MIS:Press, 1996.
Marmel, Elain, Easy Lotus® Notes Release 4.0,Que Corporation, 1996.
Lotus Development Corporation, Lotus Notes Server Up and Running!, Release 4, 1996.

Falkner, Mike, "How to Plan, Develop, and Implement Lotus Notes in Your Organization", Wiley Computer Publishing, John Wiley and Sons, Inc., 1996.

Lamb, John P., et al., "Lotus Notes Network Design", McGraw-Hill, 1996.

Tamura, Randall A., et al., Lotus notes 4 Unleashed, Sam's Publishing, 1996.

Dahl, Andrew, Lotus Notes 4 Administrator's Survivor Guide, Sam's Publishing, 1996.

Netscape Communications Corporation, Administrator's Guide, Netscape News Server, Version 2.0, 1996.

Lotus Development Corporation, Lotus Notes Internet Cookbook for Notes Release 3, Jan. 16, 1996.

Wong, Harry, "Casahl's Replic-Action: Delivering True Notes/DBMS Integration", The View Technical Journal for Lotus Notes® Software, vol. 2, Issue 1, Jan./Feb. 1996, pp. 33-50.

Lotus Notes Advisor, Advisor Publications, Jan./Feb. 1996, entire magazine.

IBM International Technical Support Organization, Lotus Notes Release 4 in a Multiplatform Environment, Feb. 1996.

Lotus Development Corporation, Lotus Notes Internet Cookbook for Notes Release 4, Feb. 14, 1996.

Lotus Notes Advisor, Advisor Publications, Apr. 1996, entire magazine.

Frenkel, Garry, "Pumping for Info; Notes and Database Integration", Network Computing, May 1, 1996, pp. 76-84.

Lotus Development Corporation, Lotus Notes Knowledge Base, "Firewall Security Overview and How Firewalls Relate to Lotus Notes", May 22, 1996.

Lotus Notes Advisor, Advisor Publications, Jun. 1996, entire magazine.

Augun, Audry, "Integrating Lotus Notes with Enterprise Data", Lotus Notes Advisor, Advisor Publications, Jul./Aug. 1996, pp. 22-25.

Lotus Notes Advisor, Advisor Publications, Aug. 1996, entire magazine.

IBM Corporation, Secrets to Running Lotus Notes: The Decision No One Tells You How to Make, Oct. 1996.

Lotus Notes Advisor, Advisor Publications, Oct. 1996, entire magazine.

Opty, Barbara, et al., "Use the Internet as Your Lotus Notes WAN", Lotus Notes Advisor, Advisor Publications, Nov./Dec. 1996, pp. 17-20.

Lotus Notes Advisor, Advisor Publications, Dec. 1996, entire magazine.

Swedeen, Bret, et al., "Under the Microscope: Domino Replication", LDD Today, Oct. 1, 1998.

Lotus Development Corporation, Lotus Inside Notes: The Architecture of Notes and the Domino Server, 2000.

"The History of Notes and Domino", Lotus Developer Domain, Lotus, Sep. 29, 2003.

International Search Report for PCT/US03/00618, Date of completion Mar. 19, 2003; Date of Mailing Apr. 4, 2003; ISA/US.

International Search Report for PCT/US03/00624, Date of completion, Apr. 8, 2003; Date of Mailing May 13, 2003; ISA/US.

International Search Report for PCT/US05/038135, Date of completion, Jan. 30, 2007; Mailing Date Aug. 8, 2008; ISA/US.

International Search Report for PCT/US05/37702, Date of completion Oct. 24, 2007; Date of Mailing Nov. 5, 2007; ISA/US.

International Preliminary Examination Report for PCT/US05/37702, Date of completion Nov. 20, 2007; ISA/US.

Written Opinion of the International Searching Authority for PCT/US05/37702; Date of completion Oct. 24, 2007; Date of mailing Nov. 5, 2007; ISA/US.

Written Opinion of the International Searching Authority for PCT/US05/38135; Date of completion Jul. 14, 2008; Date of mailing Aug. 8, 2008; ISA/US.

Stolowitz Ford Cowger, LLP, Listing of Related Cases, Jul. 13, 2009.

Victor S. Miller, "Use of Elliptic Curves in Cryptography", Lecture Notes in Computer Science, May 21, 1986, vol. 218, p. 417-426, Advances in Cryptology-CRYPTO' 85.

Haas et al., "The design and performance of mobile TCP for wireless networks", Journal of High Speed Networks, IOS PRess, Amsterdam NL, vol. 10, No. 3; Jan. 1, 2001; pp. 187-207.

Haas et al., "Mobile-TCP: an asymmetric tansport protocol design for mobile systems", Communications 1997, ICC '97 Montreal, Towards the Knowledge Millennium 1997 IEEE International Conference on Montreal, Que., Canada; Jun. 8, 1997, pp. 1054-1058.

Maltz et al., "MSOCKS: an architecture for transport layer mobility", Infocom '98, Seventeenth Annual Joint Conference of the IEEE Computer and Communications Societies, Proceedings, IEEE San Francisco, CA; Mar. 29, 1998; pp. 1037-1045.

Supplementary European Search Report for EP03705704; May 31, 2010; 4 pages.

* cited by examiner

SOURCE

TRANSFER AGENT

SECURE TRANSPORT FOR MOBILE COMMUNICATION NETWORK

The present application is a continuation and claims priority to pending U.S. patent application Ser. No. 10/339,369, filed Jan. 9, 2003, which is a nonprovisional of U.S. patent application Ser. No. 60/346,881, filed Jul. 8, 2002, and U.S. patent application No. 60/403,249, filed Aug. 12, 2002, all of which are incorporated by reference.

BACKGROUND

Security is a concern when information is transferred over the Internet. Encryption technology may be used to protect data transferred between two nodes communicating across a network such as the Internet. The Internet infrastructure involved in transferring a particular set of data may include one or more intermediary network processing nodes that need to process different portions of the data in order to correctly route the packets between the two endpoints.

The intermediary network processing nodes may be given access to the encryption key used to encrypt the data. However, decrypting the packets at the intermediary points presents a security risk. For example, an eavesdropper may be able to access the data after being decrypted at the intermediary network processing nodes.

The present invention addresses this and other problems associated with the prior art.

SUMMARY OF THE INVENTION

A communication node encrypts a first portion of a transaction associated with point-to-point communications using a point-to-point encryption key corresponding to a first security association. A second portion of the transaction associated with end-to-end communications is encrypted using an end-to-end encryption key corresponding to a second security association.

The foregoing and other objects, features and advantages of the invention will become more readily apparent from the following detailed description of a preferred embodiment of the invention which proceeds with reference to the accompanying drawings.

DETAILED DESCRIPTION

The transfer of different types of data may be referred to below generally as a transaction. These transactions can be used for transferring email data, calendars, contacts, tasks, notes, electronic documents, files or any other type of control or content data.

Figure 1:
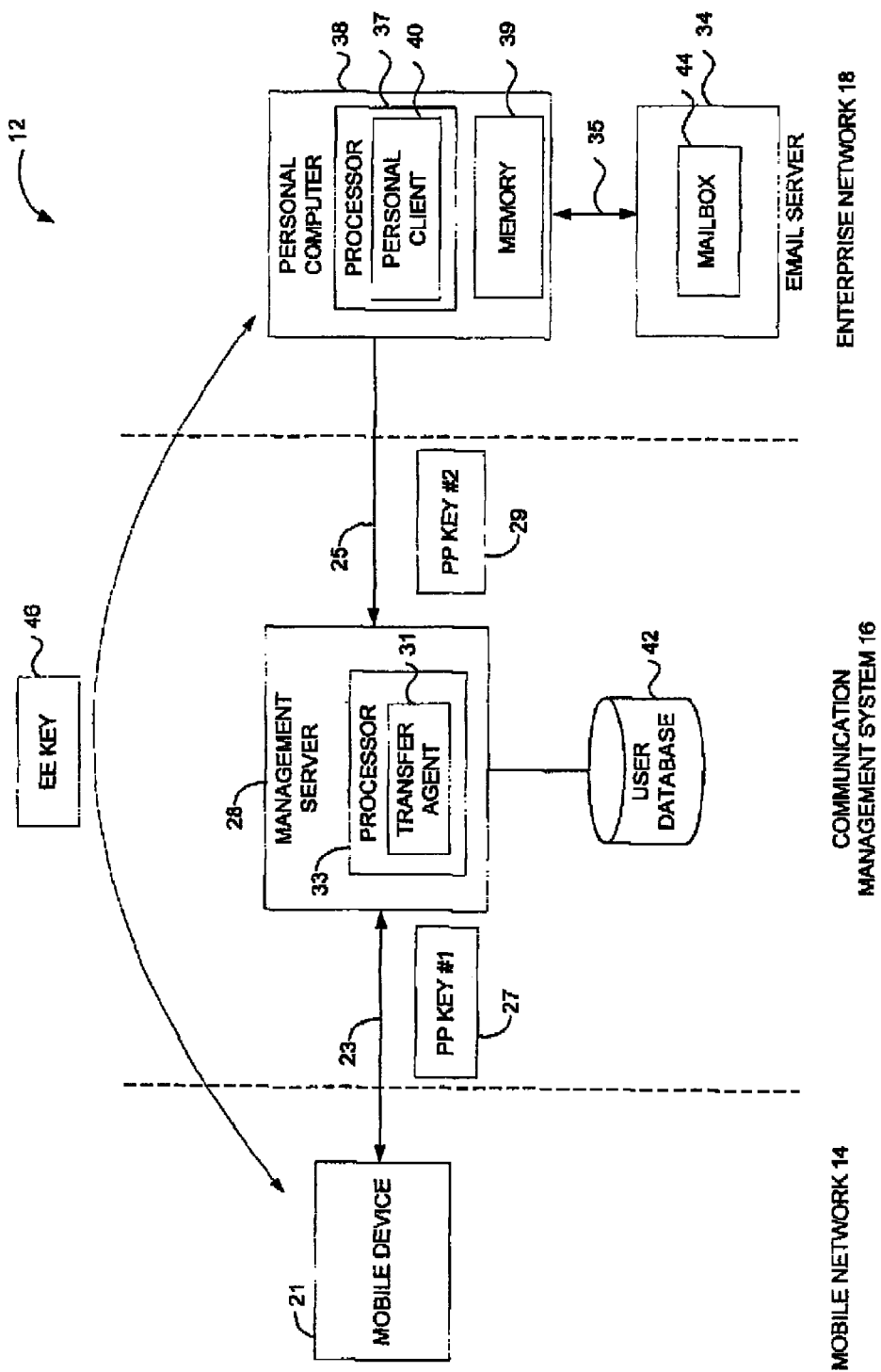
FIG. 1 is a block diagram showing how encryption keys are exchanged in a communication network.

FIG. 1 shows one embodiment of a communication network 12 that includes a mobile network 14, an enterprise network 18, and a communication management system 16 that manages communications between the mobile network 14 and the enterprise network 14. The mobile network 14 includes mobile devices 21 that communicate with an IP infrastructure through a wireless or landline service provider. Since mobile networks 14 are well known, they are not described in further detail.

The enterprise network 18 can be any business network, individual user network, or local computer system that maintains local email or other data for one or more users. In the embodiment shown in FIG. 1, the enterprise network 18 includes an email server 34 that contains a user mailbox 44 accessible using a Personal Computer (PC) 38. In one example, the email server 34 may be a Microsoft® Exchange® server and the PC 38 may access the mailbox 44 through a Microsoft® Outlook® software application. The mailbox 44 may contain emails, contact lists, calendars, tasks, notes, or any other type of data or electronic document.

The PC 38 is connected to the email server 34 over a Local Area Network (LAN) 35. The PC 38 includes memory 39 for storing local files that may include personal email data as well as any other types of electronic documents. Personal client software 40 is executed by a processor 37 in the PC 38. The personal client 40 enables access to email, calendars, and contact information as well as local files for mobile device 21.

The communication management system 16 includes at least one management server 28 that includes a processor 33. The processor operates a transfer agent 31 that manages the transactions between the mobile device 21 and the enterprise network 18. A user database 42 includes configuration information for different users of a mobile communication server. For example, the user database 42 may include login data for user of the mobile communication server. While referred to as a management system 16 and management server 28, this can be any intermediary system that includes one or more intermediary servers that operate between the mobile network 14 and the enterprise or private network 18.

The personal client 40 makes an outbound connection 25 to the management server 28. The personal client 40 registers the presence of a particular user to the management server 28 and negotiates a security association specifying a cryptographic ciphersuite (including encryption cipher, key length, and digital signature algorithm) and a unique, secret point-to-point encryption key 29 over connection 25. In one example, the key 29 is an Advanced Encryption Standard (AES) key, which is negotiated using the Diffie-Hellman cryptographic algorithm. Of course, encryption ciphers other than AES can also be used. The encryption key 29 enables secure communication between management server 28 and PC 38 over connection 25.

The mobile device 21 negotiates a point-to-point security association, specifying a cryptographic ciphersuite and a unique encryption key 27, with the management server 28. In one example, the point-to-point encryption key 27 is an AES encryption key. The negotiated security association that includes encryption key 27 enables secure point-to-point communication between the mobile device 21 and the management server 28 over connection 23. Each different mobile device 21 must negotiate a different security association that includes a unique encryption key 27 with the management server 28.

The point-to-point encryption key 27 may be used for encrypting control data that needs to be transferred between the mobile device 21 and management server 28. The point-to-point encryption key 29 may be used for encrypting control data that needs to be transferred between the management server 28 and personal client 40. For example, the control data may include login information and transaction routing information.

An end-to-end security association, specifying a cryptographic ciphersuite and a unique encryption key 46, is negotiated between the mobile device 21 and the personal client 40. In one example, the end-to-end encryption key 46 is an AES encryption key. The end-to-end encryption key 46 is used for encrypting transaction payloads transferred between personal client 40 and mobile device 21. For example, the end-to-end encryption key 46 may be used for encrypting the content of emails, files, file path names, contacts, notes, calendars, electronic documents and any other type of data that needs to be securely transferred between mobile device and the PC. The end-to-end encryption key 46 is only known by the mobile device 21 and the personal client 40. Data encrypted using the end-to-end key 46 cannot be decrypted by the management server 28.

Figure 2:
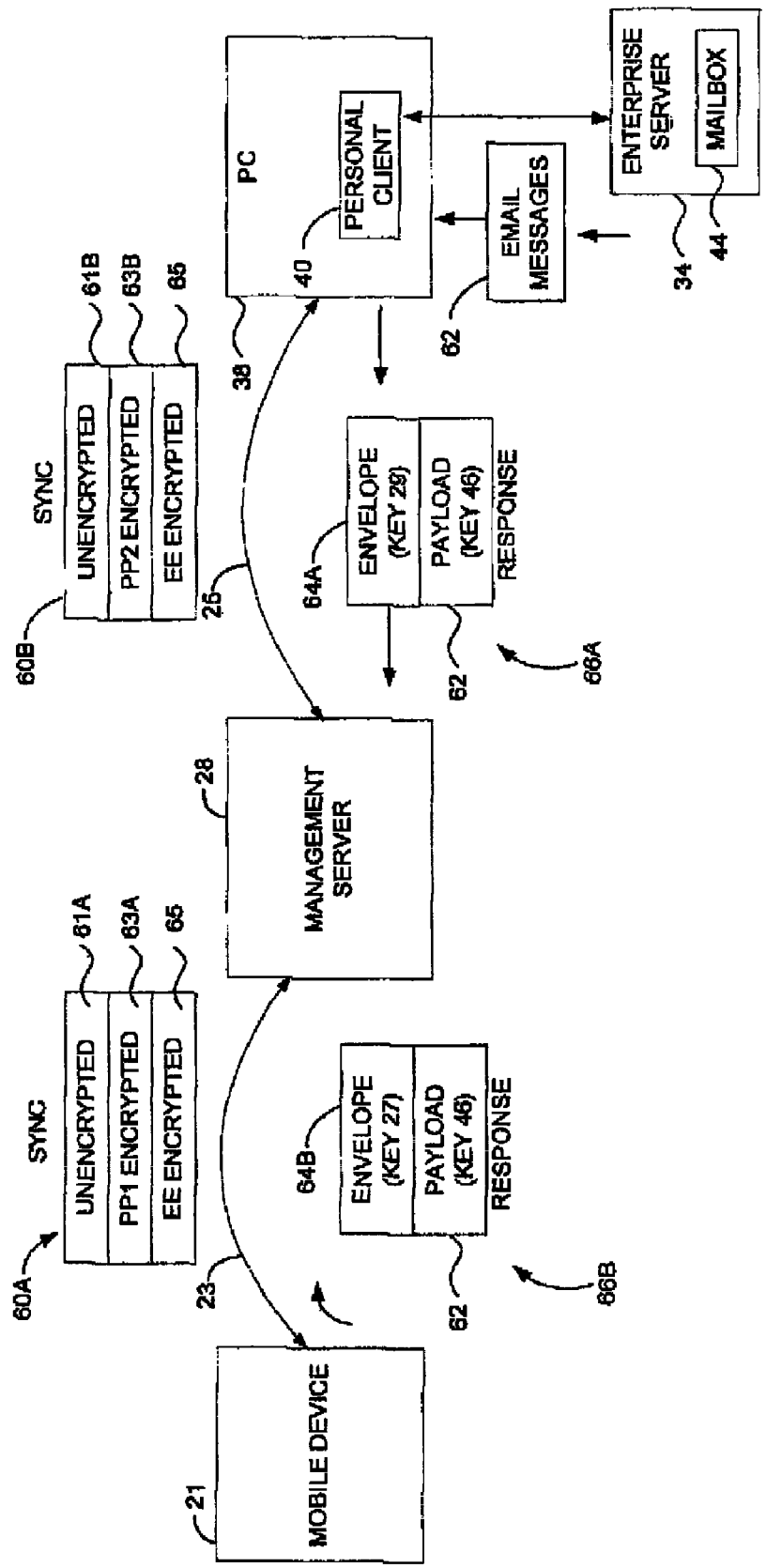
FIG. 2 is a block diagram showing how data is encrypted according to the encryption keys.

FIG. 2 shows an example of a synchronization transaction 60A sent by the mobile device 21 requesting retrieval of the latest email messages in mailbox 44. One portion 63A of the synchronization transaction 60A is encrypted by the mobile device 21 using the point-to-point encryption key 27 (FIG. 1). Another portion 65 of synchronization transaction 60A is encrypted using the end-to-end encryption key 46. Another third portion 61A of the synchronization transaction 60 may not be encrypted at all. The mobile device 21 sends the synchronization transaction 60A to the management server 28 over connection 23.

The management server 28 decrypts the portion 63A of the transaction 60 encrypted using the point-to-point encryption key 27. Since server 28 does not have encryption key 46, portion 65 is not decrypted. The management server 28 decodes any unencrypted data 61A and the decrypted point-to-point data 63A to determine how to process the synchronization transaction 60A. Part of the processing may include re-encrypting some or all of the decrypted data 63A back into point-to-point encrypted data 63B using encryption key 29. The management server 28 may also modify or add to the unencrypted data 61A to generate new unencrypted data 61B. The unencrypted data 61B and the re-encrypted point-to-point data 63B are combined with the end-to-end encrypted data 65 to generate new synchronization transaction 60B. The transaction 60B is transported to personal client 40 over the connection 25.

The personal client 40 decrypts the point-to-point encrypted data 63B using the encryption key 29 and decrypts the end-to-end encrypted data 65 using the encryption key 46. The personal client 40 obtains email messages 62 from the mailbox 44 pursuant to the decrypted instructions in synchronization transaction 60B. The personal client 40 encrypts the content of the email messages 62 using the end-to-end encryption key 46.

The personal client 40 generates a response transaction 66A that may attach an envelope 64A to the end-to-end encrypted email messages 62. The envelope 64A may contain communication parameters identifying transaction 66A as a response to the synchronization transaction 60B and may contain other message parameters such as the size of the email messages 62.

Some or all of the envelope 64A may be encrypted using the point-to-point encryption key 29. The personal client 40 then sends message 66A to the management server 28. The management server 28 decrypts the envelope 64A using the point-to-point encryption key 29 and processes the decrypted data necessary for forwarding the response transaction 66A to the mobile device 21. The payload 62 in the response transaction 66A is not decrypted since the management server 28 does not have access to end-to-end key 46.

The management server 28 re-encrypts some or all of the information in envelope 64A into envelope 64B. The envelope 64B is re-encrypted using the point-to-point key 27. A response message 66B is generated that includes the envelope 64B and end-to-end encrypted payload 62.

The response message 66B is transported to mobile device 21 over connection 23. The mobile device 21 decrypts the envelope 64B using encryption key 27 and decrypts the payload 62 using the encryption key 46. The decrypted payload 62 is then displayed on the mobile device 21. For example, emails from the mailbox 44 are displayed on the mobile device 21.

Figure 3:
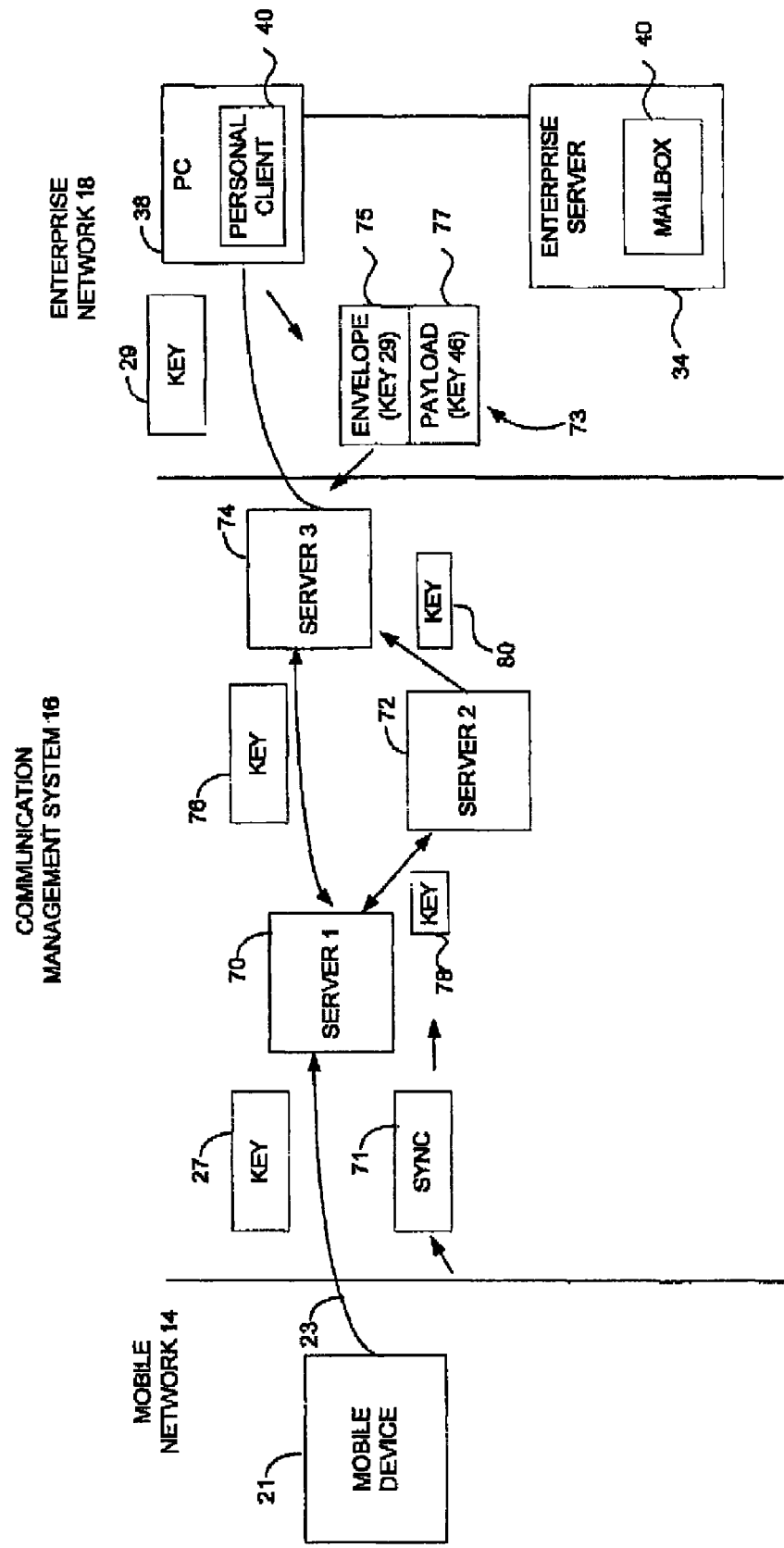
FIG. 3 is a block diagram showing how multiple encryption keys are exchanged between different servers in the communication network.

FIG. 3 shows another embodiment of the invention. The communication management system 16 may include multiple servers 70, 72 and 74 that each perform different communication management tasks. Transactions 71 and 73 sent between mobile device 21 and PC 38 may need to be processed by different combinations of servers 70, 72 and 74.

Encryption key 76 is negotiated between server 70 and server 74, encryption key 78 is negotiated between server 70 and server 72, and encryption key 80 is negotiated between server 72 and server 74. The negotiated encryption keys 76, 78 and 80 are used when processing the transactions 71 and 73.

For example, the transaction 73 may be sent from personal client 40 to server 74. The personal client 40 encrypts some or all of the envelope 75 in transaction 73 using the encryption key 29 and encrypts a payload 77 using encryption key 46. After receiving transaction 73, server 74 decrypts envelope 75 using encryption key 29.

Server 74 may then need to send the transaction 73 to server 70. Server 74 re-encrypts the decrypted envelope 75 using encryption key 76. Upon receiving message 73, server 70 decrypts envelope 75 using encryption key 76. After processing the contents, the server 70 re-encrypts the envelope 75 using the encryption key 27 previously negotiated with mobile device 21. The transaction 73 is then sent from server 70 to mobile device 21. Similar to FIG. 2, the servers 70, 72 and 74 never have access to the encrypted payload 77 in transaction 73.

A synchronization transaction 71 on the other hand may need to be processed by all three servers 70, 72 and 74, A portion of the synchronization transaction 71 is encrypted using encryption key 27 when transported from mobile device 21 to server 70. Encryption key 78 is used for encrypting a portion of transaction 71 when transported from server 70 to server 72. Encryption key 80 is used to encrypt a portion of synchronization transaction 71 when transported from server 72 to server 74. Encryption key 29 is then used when the transaction 71 is transported from server 74 to PC 38.

Algorithms exist that allow secure negotiation of encryption keys between two nodes that are communicating directly with each other or that are communicating through intermediary nodes. One example of an encryption algorithm that allows secure key negotiation regardless of network topology is Elliptic Curve Cryptography Diffie-Hellman (ECC-DH).

Figure 4:
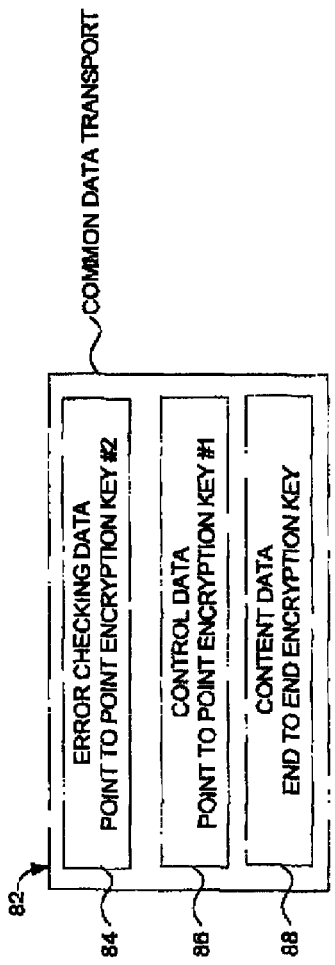
FIG. 4 is a diagram showing how different types of data are encrypted using different encryption keys.

FIG. 4 shows how encryption is performed differently for different types of data or for data associated with different destinations. Transaction 82 includes content data 88 such as the contents of an email message, an electronic document, or any other type of information that should only be accessed by two endpoints. The content data 88 is encrypted using an end-to-end encryption key.

A second portion 86 of transaction message 82 may include control information that only needs to be processed by one particular server. In this case, control data 86 is encrypted using a first point-to-point encryption key. A third portion of data 84 in transaction 82 may have other control information, for example, error checking data, that needs to be processed by a different server. Accordingly, the error checking data 84 is encrypted using a second point-to-point encryption key different than either of the other two encryption keys used for encrypting data 88 and 86.

Figure 5:
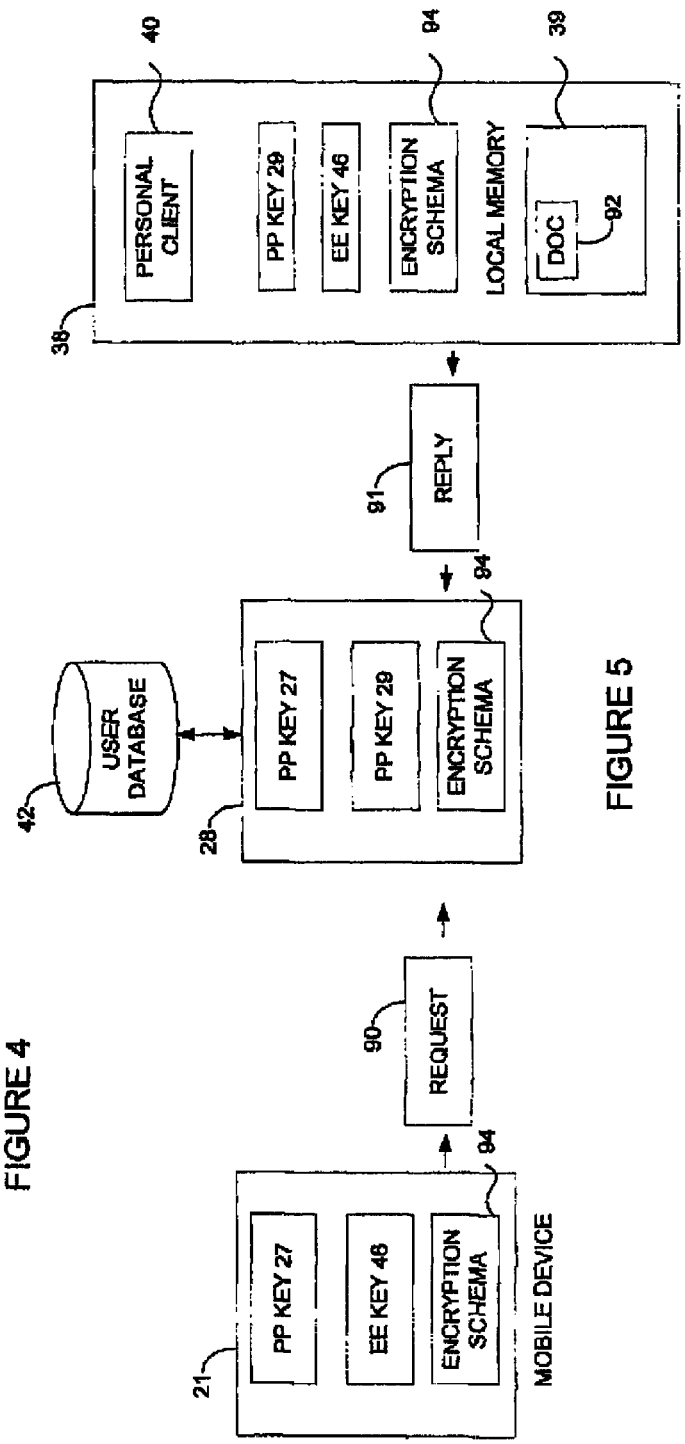
FIG. 5 is a diagram showing an encryption schema used for encrypting transactions.

FIG. 5 explains in more detail how an encryption scheme is used by the mobile device 21, management server 28, and personal client 40 when processing transactions between a source and a target device. In the example below, the mobile device 21 is operating as a source for sending a transaction 90. The transaction 90 requests personal client 40 to send a document 92 located in a personal directory in local memory 39 of PC 38. The personal client 40 operates as a target for the transaction 90 and the management server 28 operates as the transfer agent for transferring the transaction 90 from the mobile device 21 to the personal client 40.

It should be understood that this is only an example, and the devices shown in FIG. 5 can process many different types of transactions. For example, the transaction 90 may request synchronization of emails in the PC 38 with emails in the mobile device 21. Further, any device can operate as a source or target for the transaction. For example, the personal client 40 operates as a source and the mobile device 21 operates as a target when a transaction 91 is sent as a reply to request 90.

The mobile device 21, management server 28, and the personal client 40 are all configured with an encryption schema 94 that identifies how specific items in the transaction 90 are to be encrypted. Each device is also configured with different security associations as described above in FIGS. 1-3. For example, the mobile device 21 has both Point-to-Point (PP) key 27 and End-to-End (EE) key 46. Management server 28 has PP key 27 and PP key 29, and the PC 38 has PP key 29 and EE key 46.

Figure 6:
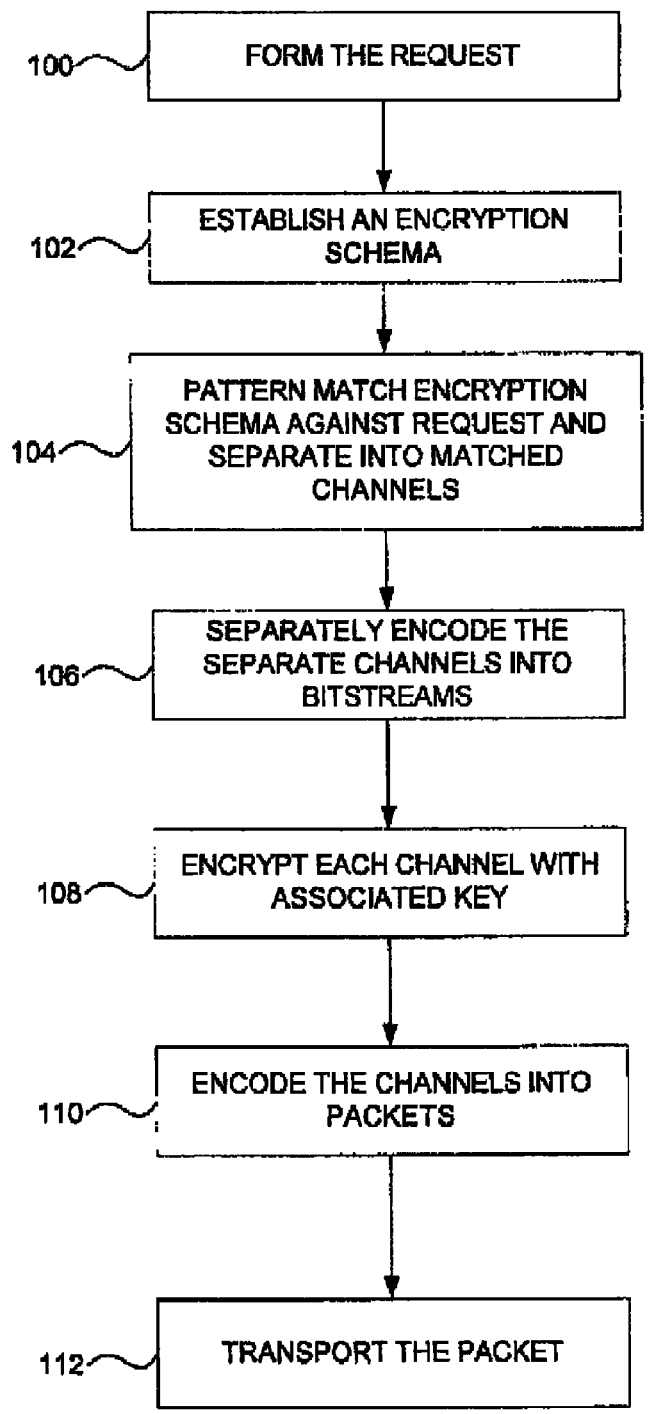
FIGS. 6-8 are block diagrams showing how different devices in the communication network use the encryption schema to encrypt and decrypt transactions.

Referring to FIGS. 5 and 6, the mobile device 21 in block 100 forms the request transaction 90. One example of a request is as follows.

```
Request:     {auth_token = "abc",
             device_id = "xyz",
             method_id = "GetDocument",
             args = {path = "/docs"}
             }
```

Mobile device 21 attaches an auth_token to transactions sent to the management server 28. For example, the mobile device 21 may be required to authenticate to the management server 28 by transmitting a username and password prior to being permitted to submit other transactions for processing. The server 28 issues the mobile device 21 an auth_token after successfully validating the username and password against information in the user database 42. The mobile device 21 then attaches the auth_token to subsequent transactions sent to the management server 28. The management server 28 uses the auth_token to identify and authenticate the source of each transaction and to determine where to route the transaction.

The device_id identifies the particular mobile device 21 sending the request 90. The device_id may be necessary for example when a user has more than one mobile device. The personal client 40 can use different device_id values to track when synchronization information was last sent to each of multiple different mobile devices. The device_id can also be used by either the management server 28 or the personal client 40 to determine how to format data sent to particular types of mobile devices 21. For example, data may need to be formatted differently for a cell phone as opposed to a personal computer. The device_id can also be used to correlate a known security association with a particular mobile device.

The method_id item in the example identifies a particular function GetDocument associated with request 90. The method_id item also requires the inclusion of related argument items that identify the parameters for the GetDocument function. For example, the argument items might include the expression path="/docs" identifying the pathname where the requested documents are located.

Block 102 in FIG. 6 establishes the encryption schema 94 previously shown in FIG. 5. One example of an encryption schema 94 is shown below illustrating how the example GetDocument request shown above would be handled in the specific case of communication between the mobile device 21 and the management server 28.

```
Encryption schema:   {GetDocument =
                        {clear = ["device_id"],
                        pp = ["auth_token", "user_id"],
                        ee = ["args.path"]
                        }
                     default = { pp }
                     }
```

Any items that do not require encryption are assigned to the data channel labeled "clear". For example, the device_id item in the example is assigned to the channel "clear". Items requiring the use of point-to-point encryption are assigned to data channel "pp" and therefore are encrypted using the PP key 27 as shown in FIG. 5. In this example the auth_token is assigned to the "pp" channel and encrypted using the PP key 27. Items requiring end-to-end encryption are assigned to the "ee" channel and encrypted using the EE key 46 shown in FIG. 5. In this example the "args.path" item is assigned to the "ee" channel and encrypted using the EE key 46.

In this example, any item that is not explicitly declared in the encryption schema 94 is assigned by default to the "pp" channel. Since the method_id item has not been specifically declared in the encryption schema 94, it is assigned to the "pp" channel by default and encrypted using the PP key 27.

It is important to note that the context of the communication determines the specific security association selected for encryption of a channel. For example, the first "pp" channel between mobile device 21 and management server 28 uses a security association different from the one established for the second, independently established "pp" channel between management server 28 and personal client 40. In this example, the first "pp" channel would employ the PP key 27 in FIG. 5 for transactions between device and server, while the second "pp" channel would use the PP key 29 for transactions between server and client. Because each security association is independently negotiated, the differences between the two aforementioned "pp" channels could extend beyond each channel having a unique key to include different key lengths (i.e. 256 bit vs. 128 bit), encryption ciphers (i.e. Triple DES vs. AES), digital signature algorithm (i.e. SHA1 vs. MD5), or other security parameters.

In order to prepare the request 90 for transmission, the mobile device 21 in block 104 of FIG. 6 performs a pattern match of the request 90 using the encryption schema 94. This pattern match separates the items in request 90 into different channels. One example of the different channels is shown below. In this example, the items in each channel are associated with predefined security associations: clear, pp, and ee.

```
Channels:
         {clear = { device_id = "xyz"}
          pp = {auth_token = "abc", method_id = "GetDocument"}
          ee = {args = {path = {path = "/docs"}}}
         }
```

In block 106, the channel contents are encoded (via a process commonly known as serialization) into arrays of bits or bytes referred to as data groups. These groupings of bits or bytes are referred to generally below as arrays but can be any type of partition, group, etc.

The contents of the clear channel are encoded into an array of bits referred to as data_group_1, the contents of the pp channel are encoded into an array of bits referred to as data_group_2, and the contents of the ee channel are encoded into an array of bits referred to as data_group_3. The contents of each channel need to be encoded into bit arrays so that they can be encrypted. The contents of the channels after being encoded into bit arrays are represented as follows.

```
Encoded
Channels:     {clear = data_group_1
               pp = data_group_2
               ee = data_group_3}
```

The bit arrays are then encrypted in block 108 according to the security association parameters for each channel. According to the encryption schema 94, bits in the clear channel (data_group_1) are not encrypted. The bits in the pp channel data_group_2 are encrypted using the point-to-point security association between mobile device 21 and management server 28, using PP key 27, and are referred to after encryption as pp_data_group_2. The bits in the ee channel data_group_3 are encrypted using the end-to-end security association between mobile device 21 and personal client 40, using EE key 46, and are referred to after encryption as ee_data_group_3. The data groups are represented as follows after encryption:

```
Encrypted
Channels:     {clear = data_group_1
               pp = pp_data_group_2
               ee = ee_data_group_3}
```

The bits making up the encrypted and unencrypted channels are then encoded into one or more packets in block 110. For clarity, the description below will refer to a single packet, however, the data from the channels may be contained in multiple packets. Some of the contents of the packet are shown below.

```
Packet

Header         length
               version
               flags
Payload        count = 3
               "clear"
               data_group_1
               "pp"
               pp_data_group_2
               "ee"
               ee_data_group_3
```

Information in the packet header may include the packet length, a version number, and other flags. The packet payload includes a count identifying 3 pairs of items. The three items include the non-encrypted contents in the clear channel, the pp encrypted contents of the pp channel, and the ee encrypted contents of the ee channel. The packet is then transported by mobile device 21 in block 112 to the management server 28.

Figure 7:
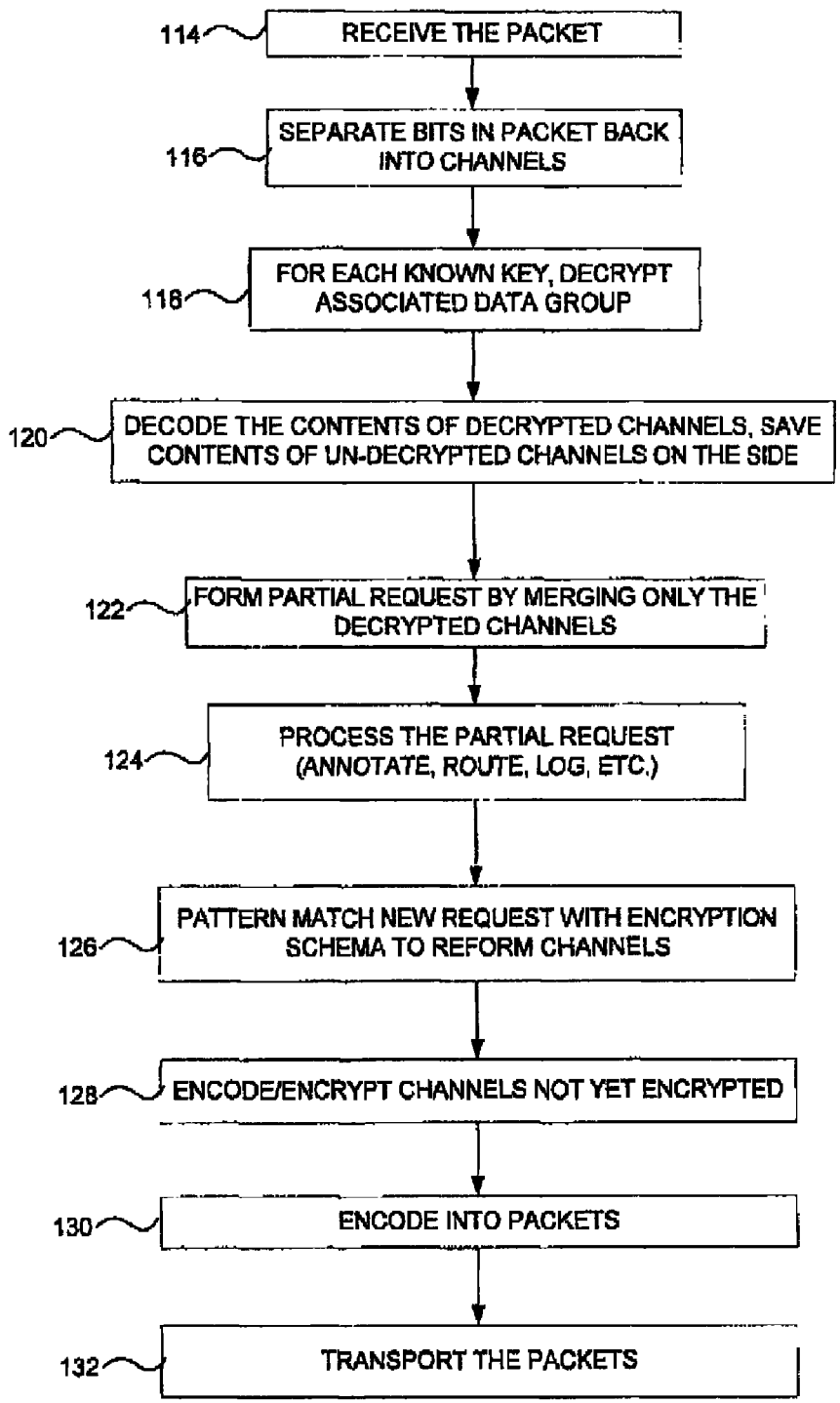

Referring to FIGS. 5 and 7, the transfer agent operating in server 28 receives the packet in block 114. The bits in the packet are separated in block 116 back into the different channels clear=data_group_1, pp=pp_data_group_2, and ee=ee_data_group_3.

The data in the clear channel does not need to be decrypted. The transfer agent in block 118 decrypts the only bits in channels for which it has a known security association. The transfer agent, as a member of the point-to-point security association between mobile device 21 and management server 28, possesses the PP key 27 and therefore decrypts the contents of the pp channel. The transfer agent is not a member of the end-to-end security association between mobile device 21 and personal client 40, does not have the EE key 46 and therefore does not decrypt the data in the ee channel. Decryption produces the following data groups: clear=data_group_1, pp=data_group_2, and ee=ee_data_group_3.

The transfer agent in block 120 decodes the contents of the clear and pp channels. The contents of the encrypted ee channel are not decoded, but instead are maintained in an unmodified state for eventual transport to the personal client 40. Decoding produces the following contents.

```
Decoded
Channels:     {clear = {device_id = "xyz"}
               pp = {auth_token = "abc", method_id = "GetDocument"}
               ee=ee_data_group_3
              }
```

In block 122 a partial request is formed by merging the items of the clear and pp channels. The partial request in this example could look similar to the following:

```
Partial Request:   {auth_token = "abc",
                    device_id= "xyz",
                    method_id = "GetDocument",
                    args = { }
                    encrypted = {ee=ee_data_group_3}
                   }
```

The transfer agent in block 124 processes the partial request. In this example, the transfer agent may verify the request is authorized by matching the value of auth_token ("abc") with contents in the user database 42 (FIG. 5). The auth_token and the method_id ("GetDocument") indicate that the transaction 90 is a document request directed to the personal client 40.

The transfer agent may identify a user_id "joe" associated with the auth_token="abc" and generate the following new request.

```
New Request:      (user_id = "joe",
                   device_id = "xyz",
                   method_id = "GetDocument",
                   args = { }
                   encrypted = {ee=ee_data_group_3}
                  }
```

In block 126 the transfer agent performs another pattern match of the new request with the encryption schema 94 to reform the channel contents associated with the different security associations. In this example, the items in the clear, pp, and ee channels are fairly similar to the items originally sent by the mobile device 21. The reformed channel contents are shown below.

```
Channels Reformed
by Transfer Agent:
    {clear = { device_id = "xyz"}
     pp = {user_id = "joe", method_id = "GetDocument"}
     ee = ee_data_group_3
    }
```

The transfer agent in block 128 encodes the contents of the clear channel into a bit array (clear=data_group_1). Since the encryption schema 28 defines no encryption for the clear channel, the bit array data_group_1 is not encrypted. The contents of the pp channel are encoded into a bit array pp=data_group_2 and then encrypted using the point-to-point security association between the management server 28 and the personal client 40, using PP key 29, forming the encrypted bit array pp=pp data_group. The contents of the ee channel have never been decrypted or decoded by the transfer agent and therefore do not need to be re-encoded or encrypted. The following represents the bit arrays for reformed transaction.

```
Encoded/encrypted
Channels:         {clear = data_group_1
                   pp = pp_data_group_2
                   ee = ee_data_group_3}
```

The transfer agent in block 130 encodes the channel contents into a packet format similar to that shown above. The packet is then transported to the personal agent 40 in block 132.

Figure 8:
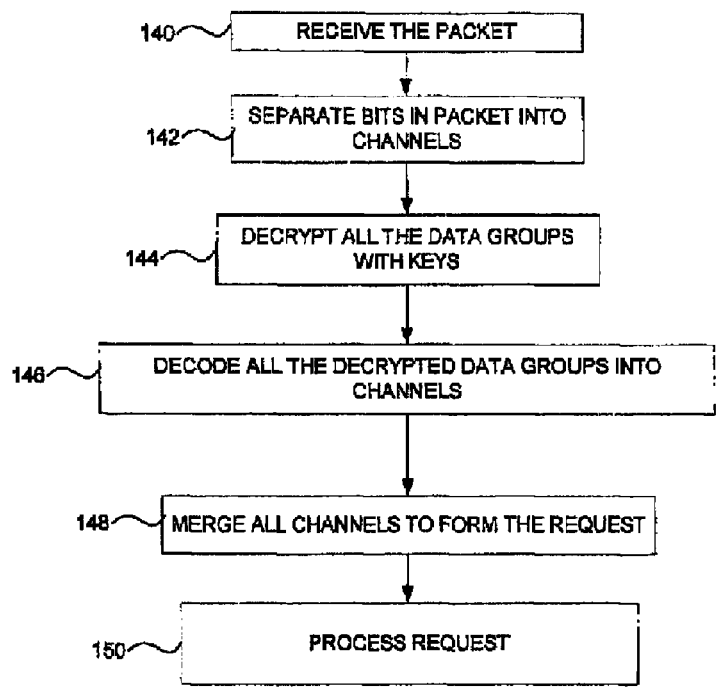

Referring to FIGS. 5 and 8, the personal client 40 is the target of the transaction 90. The personal client 40 receives the packet in block 140 and separates the bits in the packet back into channels in block 142.

```
Encoded/encrypted
Channels:         {clear = data_group_1
                   pp = pp_data_group_2
                   ee = ee_data_group_3}
```

The personal client 40 has the PP key 29, the EE key 46, and knowledge of the relevant security associations. Therefore the contents of both the pp channel and the ee channel are decrypted in block 144 generating the following decrypted bit arrays.

```
Decrypted
Channels:         {clear = data_group_1
                   pp = data_group_2
                   ee = data_group_3}
```

The contents of the channels are then decoded in block 146 generating the following request items.

```
Decoded
Channels:         {clear = { device_id = "xyz"}
                   pp = {user_id = "joe",
                   method_id = "GetDocument"}
                   ee = {args = {path = "/docs"}
                  }
```

The contents of the channels are then merged together in block 148 forming the reformed request 90 with the auth_token replaced with the user_id.

```
Request 90:       {device_id = "xyz",
                   user_id = "joe",
                   method_id = "GetDocument",
                   args = {path = "/docs"}
                  }
```

The personal client 40 processes the request 90 in block 150. Pursuant to the request 90, the personal client 40 retrieves the identified documents and then creates a reply transaction 91 (FIG. 5) in a manner similar to mobile device 21 formed request 90. For example, the retrieved documents are encrypted using the end-to-end security association between the personal client 40 and the mobile device 21, using EE key 46. Some or all of the control information in the reply 91 is encrypted using the point-to-point security association between the personal client 40 and the management server 28, which includes PP key 29. The reply 91 may look similar to the following.

```
Reply 91:         {method_id = "GetDocumentResponse",
                   args = {document = xxx,
                      size = 5123,
                      content_type="text/plain",
                      name ="readme.txt"}
                  }
```

According to the encryption schema, the method_id may be encrypted using the PP key 29 and the remainder of the contents in reply 91 may be encrypted using the EE key 46.

Data Streaming

Figure 9:
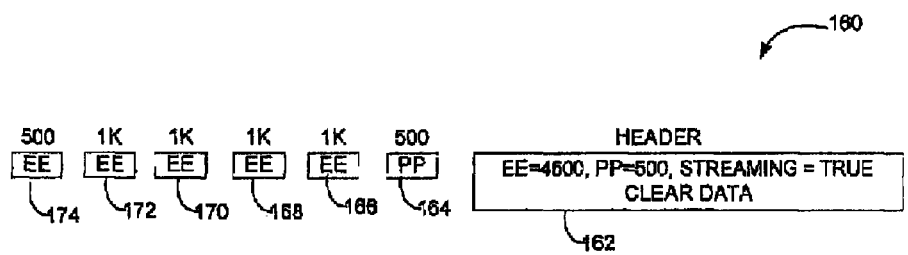
FIG. 9 shows how a large transaction is encoded into multiple packets.

Referring to FIG. 9, multiple packets 162-174 are used for transporting different portions of the same transaction 160. The multipacket transaction 160 may be used when one or more large documents are transferred between personal client 40 and the mobile device 21.

In one example, predetermined maximum packet length is configured to be 1000 bytes. If the transaction 160 is determined to be less than 1000 bytes, the contents of the clear, pp, and ee channels are encoded into a single packet. However, in this example, it is determined that 500 bytes of data exist in the pp channel and 4500 bytes of data exist in the ee channel. All the contents of the pp channel are encoded into a 500 byte packet 164. The data from the ee channel is encoded into four separate 1000 byte packets 166-174 and one 500 byte packet 174.

A header packet 162 is formed that identifies all the packets 162-174 as part of the same transaction 160. The data in the header packet 162 is unencrypted. Since the header packet 162 is unencrypted, it can also contain data from the clear channel. Alternatively, data from the clear channel can be encoded into a separate unencrypted packet. The header packet 162 identifies 500 bytes of data encrypted using the PP encryption key and 4,500 bytes of data encrypted using the EE encryption key.

The node receiving the message 160 reads the header 162 and determines the transaction 160 is a multipacket message (streaming=true). In one embodiment, the clear packet header 162 always comes first and is immediately followed by the pp packet 164. The pp packet 164 is immediately followed by ee packets 166-174. This order can be guaranteed using protocols such as Transmission Control Protocol/Internet Protocol (TCP/IP). Transmitting the packets in this predetermined order eliminates having to attach labels to each packet to identify the type of encryption. Alternatively, sequence numbers can be assigned to the packets 162-174.

The node receiving transaction 160 may receive, decrypt and decode different portions of the transaction 160 at a time. For example, the processing node may first process the unencrypted clear data in the header packet 162 to determine if the transaction 160 is unauthorized. If the transaction is not authorized, the processing node can discard the remainder of the transaction 160 without having to decrypt and decode the pp packet 164 and ee packets 166-174.

If the information in the header packet 162 is authorized, the processing node decrypts and decodes data in the pp packet 164. If the data in the pp packet 164 is invalid or has been tampered with, the remaining ee packets 166-174 can be discarded without being further processed.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method for encrypting channels of data in a transaction comprising:
   encryption of a first data channel in the transaction using a first security association known by a network intermediary device;
   encryption of a second data channel in the transaction using a second security
   association known by a network endpoint device but unknown to the network intermediary device,
   wherein the first data channel consists of control data and the second data channel consists of payload data.

2. The method according to claim 1 wherein the first data channel consists of point-to-point data and the second data channel consists of end-to-end data.

3. The method according to claim 1 wherein the control data in the first data channel includes transaction authentication and routing information and the payload data in the second data channel includes the contents of email messages or electronic files.

4. The method according to claim 1 further comprising:
   negotiating a first encryption key with the network intermediary device, the first encryption key used for encrypting/decrypting the control data in the first data channel; and
   negotiating a second encryption key with the network endpoint device, the second encryption key used for encrypting/decrypting the payload data in the second data channel.

5. The method according to claim 1 further comprising leaving a third data channel in the transaction unencrypted.

6. The method according to claim 1 further comprising:
   separating different items in the transaction into different data channels;
   assigning different security associations to the different data channels;
   encoding the separated items into data groups;
   encrypting some or all of the data groups according to the security associations assigned to the data channels; and
   encoding the processed data groups into one or more packets.

7. The method according to claim 1 further comprising:
   encoding a first set of packets containing the control data in the first channel;
   encoding a second set of packets containing the payload data in the second channel; and
   encoding a packet header that contains unencrypted data, the packet header used for transporting the first and second set of packets to the network intermediary device and at least partially used to transport at least the second set of packets from the network intermediary device to the network endpoint device.

8. A network processing device, comprising:
   one or more processors configured to:
   receive a transaction from a first network device containing a first portion of data encrypted using a first known encryption key and a second portion of data encrypted using a second unknown encryption key;
   decrypt the first portion of data using the first encryption key while the second portion of data remains encrypted;
   using the decrypted first portion of data to authenticate the transaction; and
   forwarding at least a portion of the transaction to a second network device when the transaction is authenticated.

9. The network processing device according to claim 8 wherein the one or more processors are further configured to negotiate the first encryption key with the first network device.

10. The network processing device according to claim 9 wherein the one or more processors are further configured to negotiate a third encryption key with the second network device, the first encryption key unknown to the second network device and the third encryption key unknown to the first network device.

11. The network processing device according to claim 10 wherein the one or more processors are further configured to re-encrypt at least some of the decrypted first portion of data using the third encryption key, and send both the re-encrypted first portion of data with the encrypted second portion of data to the second network device.

12. The network processing device according to claim 11 wherein the transaction includes a third unencrypted portion of data, the one or more processors further configured to combine at least some of the decrypted first portion of data with the third unencrypted portion of data and send the combined first and third portion of data to the second network device.

13. A method for encrypting information, comprising:

negotiating a first encryption key with a first endpoint;

receiving a transaction from the first endpoint containing control data encrypted using the first encryption key and payload data encrypted using a second unknown encryption key; and decrypting the control data to determine how to process and relay the transaction over a network to a second endpoint while the payload data remains encrypted.

14. The method according to claim 13 further comprising:

negotiating a third encryption key with the second endpoint;

re-encrypting at least some of the decrypted control data into new encrypted control data using the third encryption key; and relaying both the re-encrypted control data and the encrypted payload data to the second endpoint.

15. The method according to claim 13 further comprising:

receiving unencrypted data in the transaction;

re-encrypting the control data using a third encryption key combining the re-decrypted control data with the unencrypted data; and relaying the re-encrypted control data, unencrypted data, and encrypted payload data to the second endpoint.

16. An apparatus comprising a non-transitory computer-readable medium having instructions, when executed by a processor or multiple communicating processors, perform a method comprising:

negotiating a first encryption key with a first endpoint;

negotiating a second encryption key with a second endpoint;

receiving a transaction from the first endpoint directed to the second endpoint, the transaction including a first portion of data encrypted using the first encryption key and including a second portion of data encrypted using an unknown encryption key;

decrypting the first portion of data using the first encryption key;

re-encrypting at least some of the first portion of decrypted data using the second encryption key; and forwarding the re-encrypted data and the encrypted second portion of data to the second endpoint.

17. The apparatus according to claim 16 further comprising:

separating items in the received transactions into channels associated with different security associations;

encoding the items in each channel into bit arrays; and encrypting or decrypting the bit arrays for each channel according to the associated security associations.

18. The apparatus according to claim 16 further comprising:

using an encryption schema to associate different types of items in the transactions with different security associations;

encrypting or decrypting items in various received or transmitted transactions according to the encryption schema.

19. The apparatus according to claim 16 further comprising:

receiving a third portion of data in the transaction that is unencrypted; and forwarding the third portion of unencrypted data to the second endpoint.

* * * * *